United States Patent
Wu et al.

(10) Patent No.: US 7,545,112 B2
(45) Date of Patent: Jun. 9, 2009

(54) FAN MOTOR CONTROL METHOD AND DEVICE THEREOF

(75) Inventors: Chia-Feng Wu, Taoyuan Hsien (TW); Yueh-Lung Huang, Taoyuan Hsien (TW); Ming-Shi Tsai, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 142 days.

(21) Appl. No.: 11/710,532

(22) Filed: Feb. 26, 2007

(65) Prior Publication Data

US 2007/0274694 A1  Nov. 29, 2007

(30) Foreign Application Priority Data

Mar. 31, 2006  (TW) .............................. 95111463 A

(51) Int. Cl.
*H02K 29/06* (2006.01)
*H02P 1/00* (2006.01)

(52) U.S. Cl. .................. 318/592; 318/400.23; 318/254; 388/811; 388/814

(58) Field of Classification Search ................. 318/592, 318/254, 560, 561, 430, 434, 606, 400.23; 73/593; 327/145; 361/103; 388/811, 814
See application file for complete search history.

(56) References Cited

U.S. PATENT DOCUMENTS

| 6,392,372 | B1* | 5/2002 | Mays, II | ................. 318/400.01 |
|---|---|---|---|---|
| 6,545,438 | B1* | 4/2003 | Mays, II | ................. 318/400.01 |
| 6,601,168 | B1* | 7/2003 | Stancil et al. | ............... 713/100 |
| 6,665,163 | B2* | 12/2003 | Yanagisawa | ................ 361/103 |
| 6,759,820 | B2* | 7/2004 | Karwath | ................. 318/400.23 |
| 6,891,342 | B2* | 5/2005 | Nakamura et al. | ............ 318/77 |
| 6,946,807 | B2* | 9/2005 | Okamoto et al. | ............ 315/291 |
| 6,979,964 | B1* | 12/2005 | Roe | ........................... 318/139 |
| 7,061,286 | B2* | 6/2006 | Nakamura | ................... 327/145 |
| 2003/0011332 | A1* | 1/2003 | Mays, II | ..................... 318/254 |
| 2004/0027105 | A1* | 2/2004 | Nakamura et al. | .......... 323/267 |
| 2005/0160323 | A1* | 7/2005 | Wu et al. | ...................... 714/39 |
| 2005/0285640 | A1* | 12/2005 | Nakamura | .................. 327/145 |
| 2007/0277613 | A1* | 12/2007 | Iwatsubo et al. | .............. 73/593 |

* cited by examiner

*Primary Examiner*—Paul Ip
(74) *Attorney, Agent, or Firm*—Birch, Stewart, Kolasch & Birch, LLP

(57) ABSTRACT

A fan motor control device comprises a clock signal generator and a drive unit. The clock signal generator generates a low-frequency clock signal. A frequency of low-frequency clock signal is less than 23 KHz. The drive unit converts the low-frequency clock signal to a high-frequency drive signal and outputs the high-frequency drive signal to drive the fan motor. A frequency of the high-frequency drive signal is higher than 23 KHz.

19 Claims, 4 Drawing Sheets

FAN MOTOR CONTROL METHOD AND DEVICE THEREOF

BACKGROUND OF THE INVENTION

1. Field of the Invention

The invention relates to a fan motor control method, and in particular to a fan motor control device.

2. Description of the Related Art

Electronic systems generate heat based on the amount of data they process. Because some electronic systems provide fast and continuous operations, heat dissipation devices for these electronic systems are more important. Various heat dissipation products are provided for users, and fan systems are currently popular among the most.

FIG. 1 depicts a conventional fan system. A fan system comprises a fan motor 1 and a control device 2 controlling the fan motor 1. The control device 2 is electrically connected to the fan motor 1 to control the fan motor 1.

The control device 2 comprises a clock signal generator 20, a digital-to-analog converter (DAC) 21, and a drive unit 22. The clock signal generator 20 generates a low-frequency clock signal S1. The low-frequency clock signal S1 can be a pulse width modulation (PWM) signal, and the frequency of the low-frequency clock signal S1 is less than 23 KHz. The DAC 21 is electrically connected to the clock signal generator 20 that receives the low-frequency clock signal S1 (digital signal) and converts into a voltage signal S2, which is an analog signal. The drive unit 22 is electrically connected to the DAC 21 and the fan motor 1 to receive the voltage signal S2. The voltage signal S2 is amplified and converted from digital to analog by the drive unit 22 to obtain a low-frequency drive signal S3. The low-frequency drive signal S3 is input to the fan motor 1 to drive the fan motor or adjust the rotation speed of the fan motor. It notes that the frequency of the low-frequency drive signal S3 output from the drive unit 22 is quite low, typically about 30 to 300 Hz. According to the following formulas, if an input frequency (f) is low, a ripple voltage ($V_{r(pp)}$) is high such that a ripple factor is high. This result in the rotation speed of the fan motor 1 is vibrated according to frequency response. Thus, the stability of the rotation rate is not satisfied and makes the noise and vibration if the rotation rate of the fan motor 1 is low.

$$r = V_{r(pp)}/V_o;$$

$$V_{r(pp)} = (1/fR_LC)*V_{op};$$

Moreover, the users cannot control the duty cycle of the fan motor 1 in a range of 0%-100% by controlling the fan motor 1 with the low-frequency drive signal S3. The rotation speed of the fan motor controlled by the users only in a range of 30%-80% at most. It limits controllable ration speed and thus is not satisfied by the demand of the users. Therefore, it is an important subjective to provide an improved fan system.

BRIEF SUMMARY OF THE INVENTION

In view of the foregoing, the invention is to provide a fan motor control method and device thereof, which can produce more than 23 KHz of high-frequency drive signal by the control device in order to drive the fan motor. This results in improving the drawbacks of stability, higher voltage and the noises by the increased frequency.

According to the foregoing objects and others, the present invention provides a fan motor control method that generates a low-frequency clock signal firstly. The frequency of the low-frequency clock signal is less than 23 KHz. Then, the low-frequency clock signal is converted to a high-frequency drive signal. The frequency of the high-frequency drive signal is higher than 23 KHz. The high-frequency drive signal is input to the fan motor to drive the fan motor.

To achieve the above objects and others, the invention discloses a fan motor control devices that a fan motor control device comprises a clock signal generator and a drive unit. The clock signal generator generates a low-frequency clock signal. The frequency of low-frequency clock signal is less than 23 KHz. The drive unit converts the low-frequency clock signal to a high-frequency drive signal and outputs the high-frequency drive signal to drive the fan motor. The frequency of the high-frequency drive signal is higher than 23 KHz.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
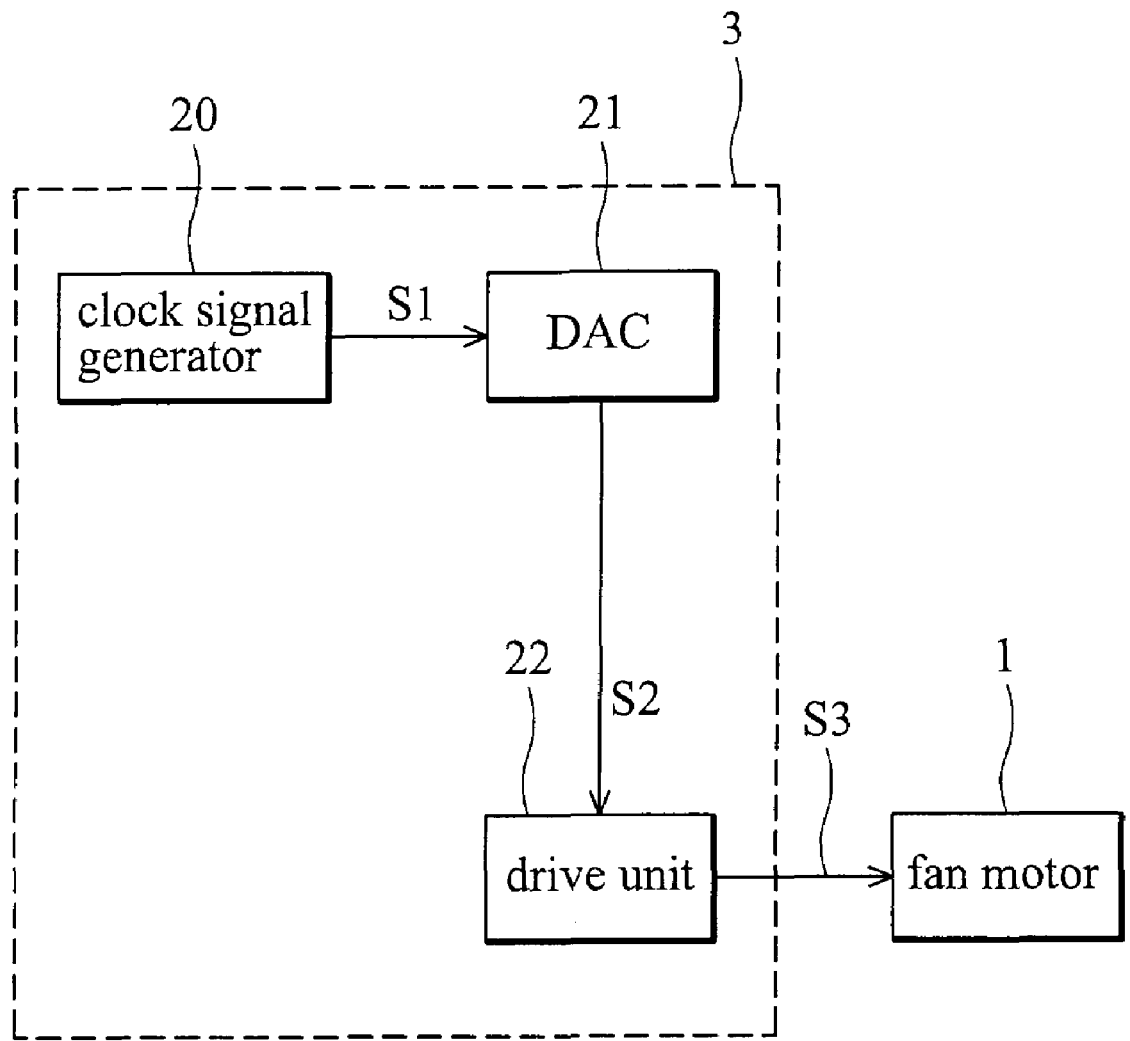
FIG. 1 depicts a conventional fan system.
Figure 2:
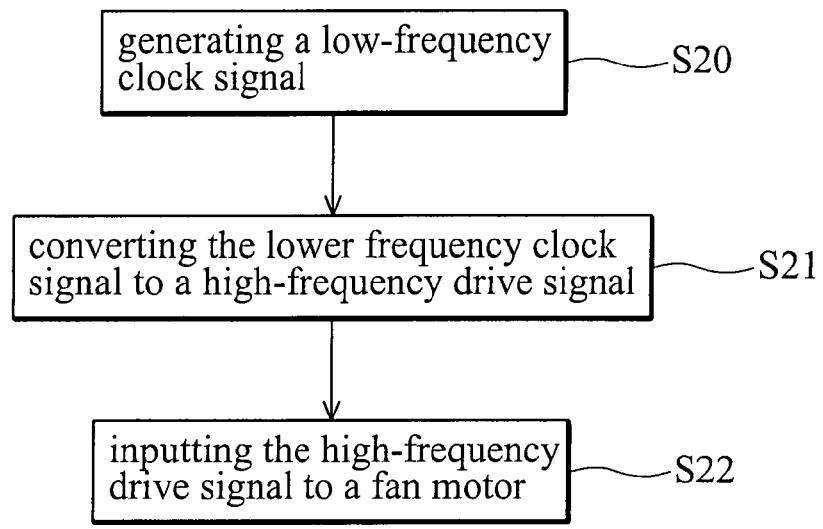
FIG. 2 is a flow chart of an exemplary embodiment of a fan motor control method.

As shown in the FIG. 2, a motor control method according to the invention includes a low-frequency clock signal is generated (step S20), and a frequency of the low-frequency clock signal is less than 23 KHz. The low-frequency clock signal is converted to a high-frequency drive signal (step S21), and the frequency of the high-frequency drive signal is higher than 23 KHz. The high-frequency drive signal is input to the fan motor to drive the fan motor or adjust the rotation speed of the fan motor (step S22).

The low-frequency clock signal or the high-frequency drive signal can be a pulse width modulation (PWM) signal. The preferred frequency of the high-frequency drive signal is higher than 23 KHz and less than 30 KHz.

Figure 3:
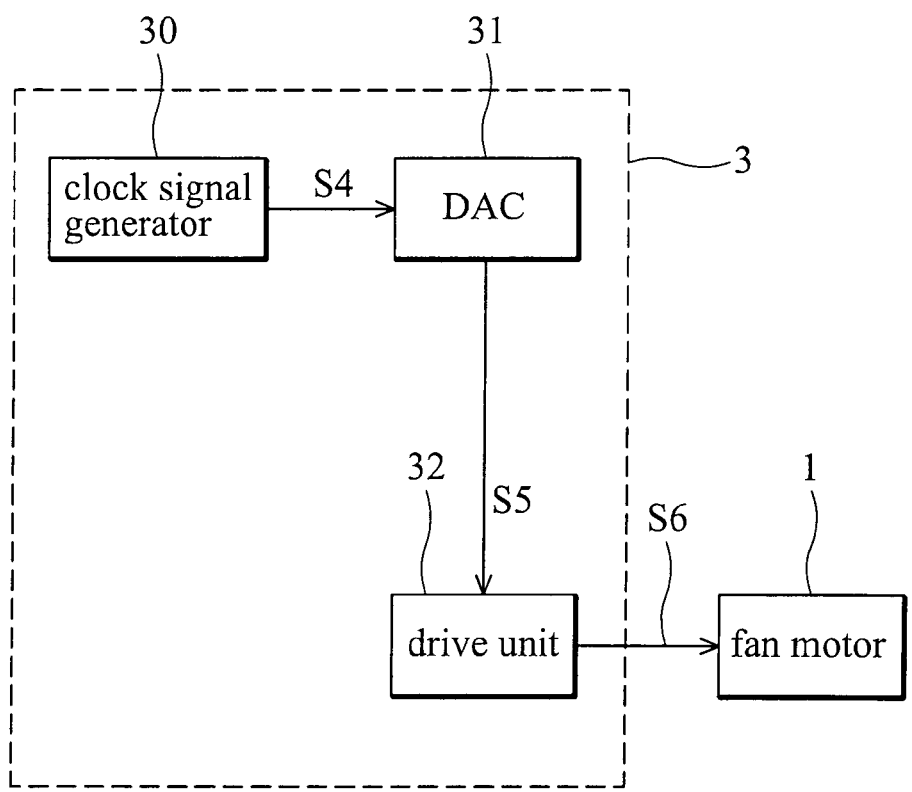
FIG. 3 depicts an exemplary embodiment of a fan motor control device.

As shown in FIG. 3, a control device 3 according to a first preferred embodiment of the invention includes a clock signal generator 30, a digital-to-analog converter (DAC) 31 and a drive unit 32.

The clock signal generator 30 generates a low-frequency clock signal S4. The frequency of the low-frequency clock signal S4 is less than 23 KHz. The DAC 31 is electrically connected to the clock signal generator 30 that receives the low-frequency clock signal S4 and converts into an analog voltage signal S5. The drive unit 32 is electrically connected to the DAC 31 and receives the voltage signal S5 from the DAC 31. The drive unit 32 converts the voltage signal S5 to a high-frequency drive signal S6. The drive unit 32 outputs the high-frequency drive signal S6 to drive the fan motor 1. A frequency of the high-frequency drive signal S6 is higher than 23 KHz. In the preferred embodiment, the drive unit 32 is able to perform the function of the DAC 31, and thus the DAC 31 is omitted.

The high-frequency drive signal S6 output from the drive unit 32 is output to the fan motor 1 to drive the fan motor 1 and adjust the rotation speed of the fan motor 1. The preferred frequency of the high-frequency drive signal S6 is higher than 23 KHz and less than 30 KHz.

The drive unit 32 can be implemented as a processor, an integrated circuit, or a programmable single chip. If the drive unit 32 is implemented as a processor or an integrated circuit, a low-frequency signal is converted to a high-frequency signal by a hardware circuit design. If the drive unit 32 is implemented as a programmable single chip, a low-frequency signal is converted to a high-frequency signal by executing a program language.

Figure 4:
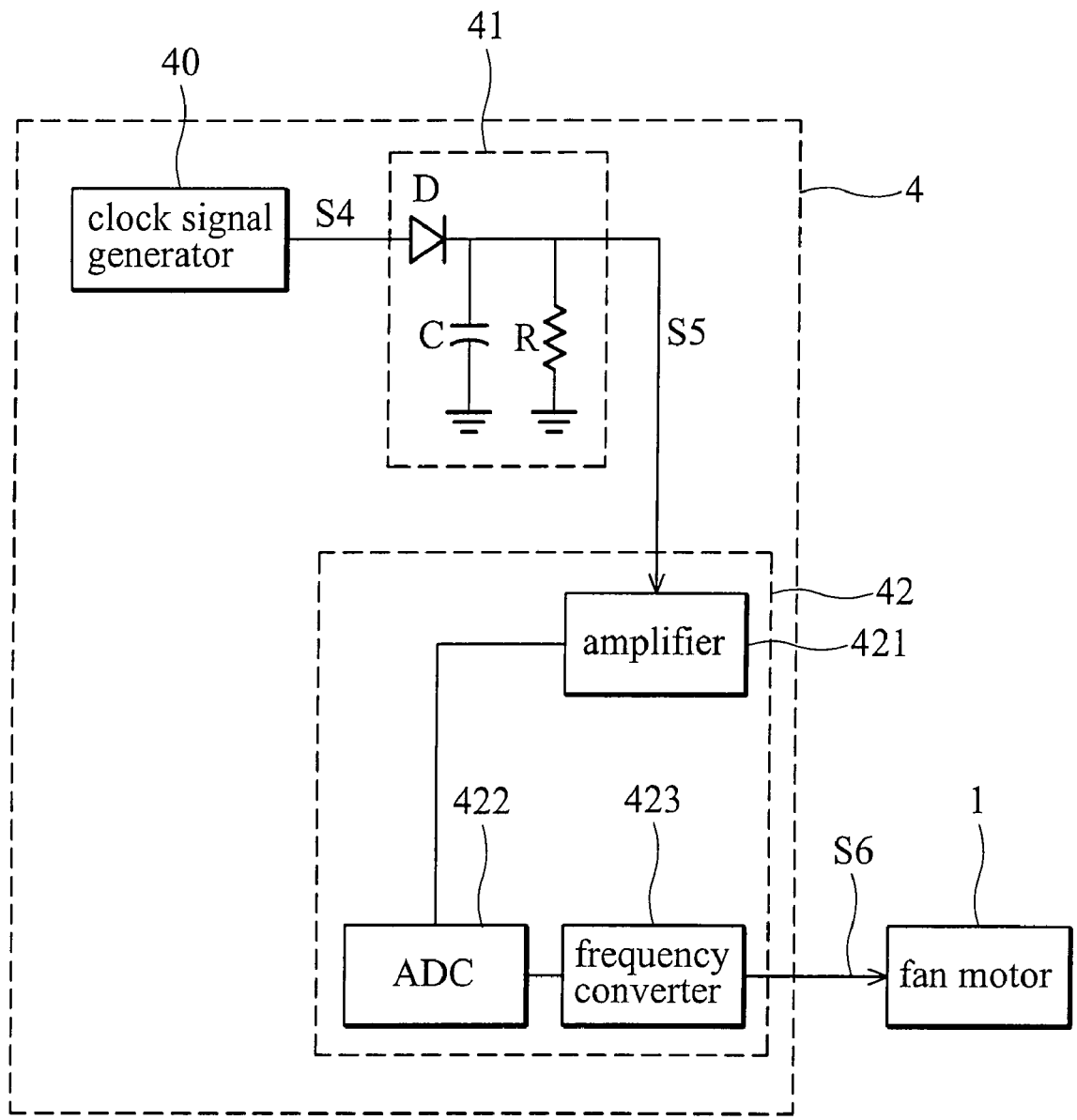
FIG. 4 depicts an exemplary embodiment of a fan motor control device.

As shown in FIG. 4, a control device 4 according to a second preferred embodiment of the invention includes a clock signal generator 40, a digital-to-analog converter (DAC) 41 and a drive unit 42.

The clock signal generator 40 in FIG. 4 has the same function as the clock signal generator 30 in FIG. 3, and thus the related description is omitted.

The DAC 41 is electrically connected to the clock signal generator 40 and the drive unit 42. In this embodiment, the DAC 41 comprises a diode D, a capacitor C, and a resistor R. A first terminal of the diode D is electrically connected to the clock signal generator 40, and a second terminal is electrically connected to the drive unit 42. A first terminal of the capacitor C and the resistor R are both electrically connected to the second terminal of the diode D, and a second terminal of the capacitor C and the resistor R are both electrically connected to a ground. The DAC 41, which is composed of the diode D, the resistor R and the capacitor C, converts a digital lower frequency clock signal S4 from the clock signal generator 40 into an analog voltage signal S5.

The drive unit 42 is electrically connected to the DAC 41 and the fan motor 1. In this embodiment, the drive unit 42 comprises an amplifier 421, an analog-to-digital converter (ADC) 422, and a frequency converter 423. The amplifier 421 receives and amplifies the voltage signal S5. The ADC 422 converts the amplified analog voltage signal to a digital clock signal, and the frequency converter 423 converts the digital clock signal to a high-frequency drive signal S6. The frequency converter 423 converts the digital clock signal to the high-frequency drive signal S6 in order to drive the fan motor 1.

The frequency of the high-frequency drive signal S6 generated by the frequency converter 423 is higher than 23 KHz. Moreover, the preferred frequency of the high-frequency drive signal S6 is higher than 23 KHz and less than 30 KHz.

Figure 5:
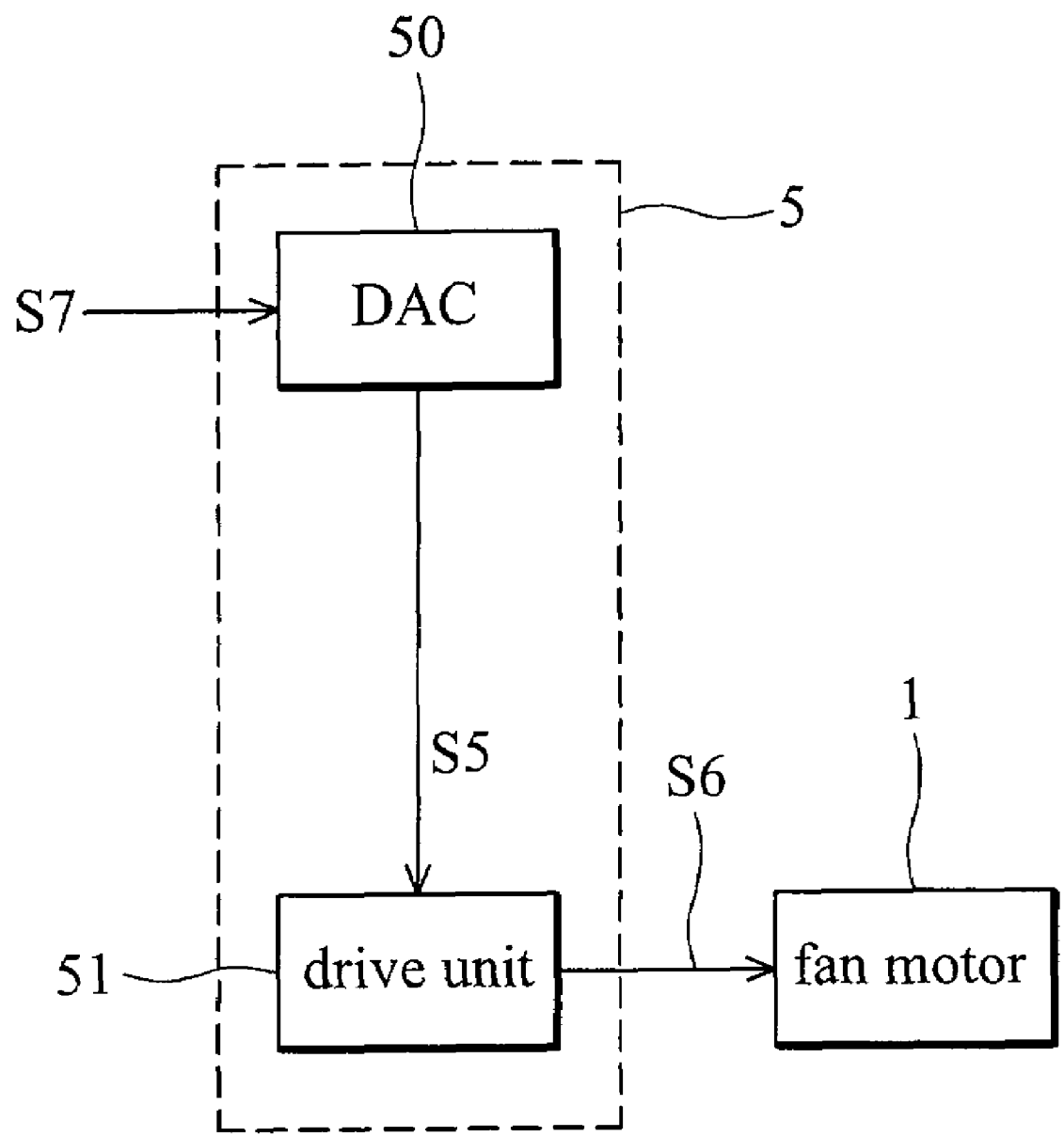
FIG. 5 depicts an exemplary embodiment of a fan motor control device.

As shown in FIG. 5, a control device 5 according to a third preferred embodiment of the invention includes a digital-to-analog converter (DAC) 50 and a drive unit 51.

The difference between the control devices 4 and 5 as respectively shown in FIGS. 4 and 5 is that the DAC 50 receives an external low-frequency clock signal S7. The external low-frequency clock signal S7 can be a pulse width modulation (PWM) signal from a system or customer terminal. The control device 5 receives the low-frequency clock signal S7, and then generates a high-frequency drive signal S6 to drive the fan motor 1. The conversion between the low-frequency clock signal S7 and the high-frequency drive signal S6 is the same as above embodiments described in FIGS. 3 and 4. Thus, the related description is omitted.

According to the disclosed embodiments, the fan motor control method and device thereof of this invention that converts a low-frequency clock signal into a high-frequency drive signal greater than 23 KHz by the control device. The input frequency (f) is increased and a ripple voltage ($V_{r(pp)}$) is reduced. Thus, the rotation speed of the fan motor did not vibrate corresponding to the frequency response so that the stability of fan motor is enhanced and not vibrated with the low rotation speed. Additionally, the human ear receives the frequency in the range of 15 KHz-20 KHz, however, the drive signal is 23 KHz to drive the fan motor in this invention. Therefore, this high-frequency drive signal can eliminate the noise. In addition, because of the enhanced stability, the users are able to control the rotation speed of the fan motor during the duty cycle of 0%~100%, and thus the fan motor control device of this invention is applied for more types of systems.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fan motor control method comprising steps of:
    generating a low-frequency clock signal with a frequency of less than 23 KHz;
    converting the low-frequency clock signal to a high-frequency drive signal for reduction of ripple voltage, wherein the high-frequency drive signal has a frequency of higher than 23 KHz; and
    inputting the high-frequency drive signal to a fan motor to drive the fan motor.

2. The fan motor control method as claimed in claim 1, wherein the frequency of the high-frequency drive signal is higher than 23 KHz and less than 30 Khz.

3. The fan motor control method as claimed in claim 1, wherein the low-frequency clock signal and the high-frequency drive signal are pulse width modulation (PWM) signals.

4. The fan motor control method as claimed in claim 1, wherein the low-frequency clock signal is converted to the high-frequency drive signal by an integrated circuit.

5. The fan motor control method as claimed in claim 4, wherein the low-frequency clock signal is converted from analog to digital to be input to the integrated circuit.

6. The fan motor control method as claimed in claim 5, wherein the converted low-frequency clock signal is amplified and converted from digital to analog in the integrated circuit, and then output by the integrated circuit to be as the high-frequency drive signal.

7. A fan motor control device comprising:
    a clock signal generator generating a low-frequency clock signal with a frequency of low-frequency clock signal is less than 23 KHz;
    a digital-to-analog converter converting the low-frequency clock signal to an analog signal; and
    a drive unit converting the analog signal to a high-frequency drive signal for reduction of ripple voltage and outputting the high-frequency drive signal to drive the fan motor, wherein the high-frequency drive signal has a frequency of higher than 23 KHz.

8. The fan motor control device as claimed in claim 7, wherein the frequency of the high-frequency drive signal is higher than 23 KHz and less than 30 KHz.

9. The fan motor control device as claimed in claim 7, wherein the low-frequency clock signal and the high-frequency drive signal are pulse width modulation (PWM) signals.

10. The fan motor control device as claimed in claim 7, wherein the digital-to-analog converter comprises:
   a diode receiving the low-frequency clock signal;
   a capacitor having a first terminal coupled to the diode and the drive unit, and a second terminal coupled to a ground; and
   a resistor having a first terminal coupled to the diode and the drive unit, and a second terminal coupled to the ground.

11. The fan motor control device as claimed in claim 7, wherein the drive unit comprises an amplifier for amplifying the analog signal.

12. The fan motor control device as claimed in claim 11, wherein the drive unit further comprises an analog-to-digital converter for converting the analog signal to a digital signal.

13. The fan motor control device as claimed in claim 12, wherein the drive unit further comprises a frequency converter for converting the digital signal into the high-frequency drive signal.

14. The fan motor control device as claimed in claim 7, wherein the drive unit is implemented by a processor, an integrated circuit, or a programmable single chip.

15. A fan motor control device comprising:
   a digital-to-analog converter receiving an external low-frequency clock signal and converting the external low-frequency clock signal to an analog signal; and
   a drive unit converting the analog signal to a high-frequency drive signal for reduction of ripple voltage and outputting the high-frequency drive signal to drive the fan motor, wherein the high-frequency drive signal has a frequency of greater than 23 KHz.

16. The fan motor control device as claimed in claim 15, wherein the frequency of the high-frequency drive signal is higher than 23 KHz and less than 30 KHz.

17. The fan motor control device as claimed in claim 15, wherein the high-frequency drive signal is pulse width modulation (PWM) signal.

18. The fan motor control device as claimed in claim 15, wherein the drive unit is a processor, an integrated circuit, or a programmable single chip.

19. The fan motor control device as claimed in claim 15, wherein the digital-to-analog converter comprises:
   a diode receiving the low-frequency clock signal;
   a capacitor having a first terminal coupled to the diode and the drive unit, and a second terminal coupled to a ground; and
   a resistor having a first terminal coupled to the diode and the drive unit, and a second terminal coupled to the ground.

* * * * *